Aug. 24, 1965
C. ROSSELET
3,202,035
SELF-BORING WALL-PLUGS
Filed April 16, 1962
2 Sheets-Sheet 1
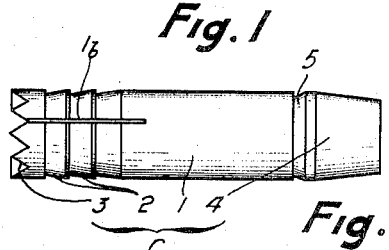
Fig. 1
Fig. 2
Fig. 3
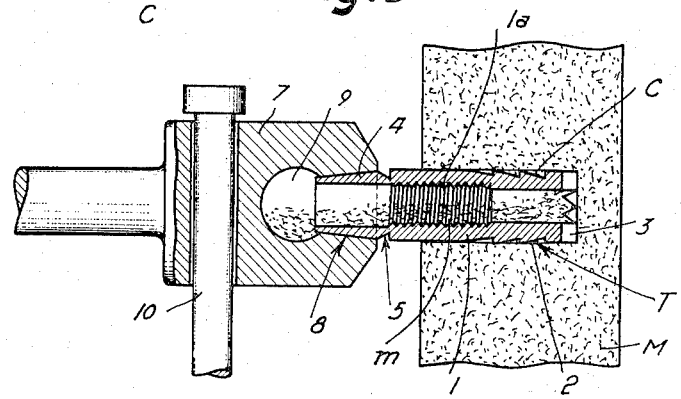
Fig. 4
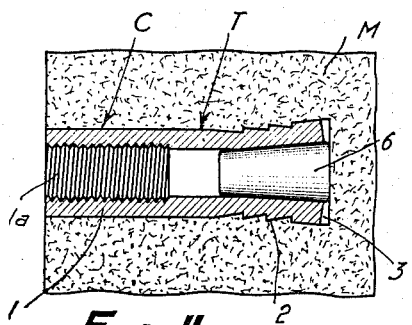
Fig. 5
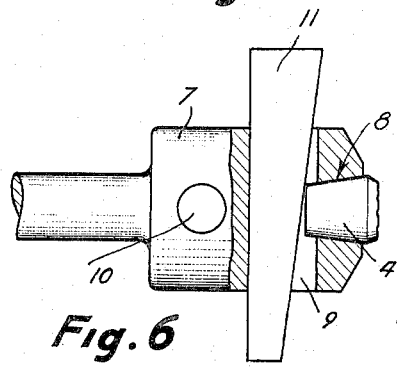
Fig. 7
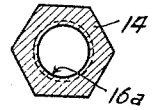
Fig. 11
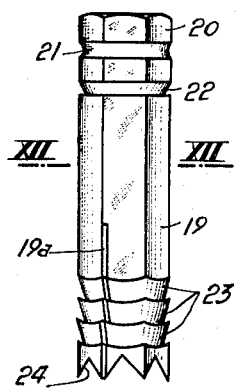
Fig. 6
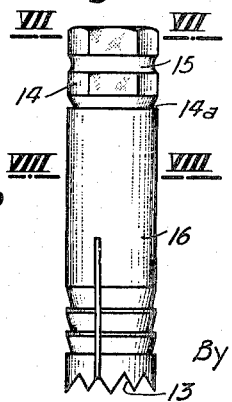
Fig. 8
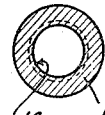
Fig. 12
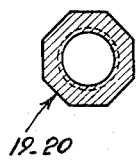
Inventor
CLAUDE ROSSELET
By Toulmin & Toulmin
Attorneys Aug. 24, 1965  C. ROSSELET  3,202,035
SELF-BORING WALL-PLUGS
Filed April 16, 1962  2 Sheets-Sheet 2

Inventor
CLAUDE ROSSELET
Toulmin & Toulmin
Attorneys

3,202,035
SELF-BORING WALL-PLUGS
Claude Rosselet, Founex, near Nyon, Switzerland, assignor to Sarmi S.A., Société d'Applications de Recherches Minières et Industrielles, Lenzerheide (Grisons), Switzerland, a Swiss company
Filed Apr. 16, 1962, Ser. No. 187,905
Claims priority, application Switzerland, Apr. 28, 1961, 5,035/61
1 Claim. (Cl. 85—68)

Self-boring wall-plugs are known which are each constituted by a hollow cylindrical body of suitably treated steel and which are each provided, on the one hand, at the front extremity thereof, with a set of teeth designed for the purpose of attacking the material in which the wall-plug is to be fixed, whilst the particles of the material thus attacked are evacuated through the axial passage of the said wall-plug and, on the other hand, near the rear extremity thereof, with a frusto-conical portion or so-called operating taper-shank connected to the body through the intermediary of a narrowed zone comprising a circular cut or groove (forming a point of incipient rupture), the said operating taper-shank being intended to be fitted inside the housing of corresponding frusto-conical shape of an operating chuck which is adapted to permit the evacuation of particles of material which have progressed inside the aforementioned axial passage, there being imparted to the said chuck and accordingly communicated to the wall-plug the shocks produced by percussion means (compressed air hammer, electric hammer, etc.) as well as a movement of rotation.

The immobilizing of the wall-plug inside of the hole which it has bored is ensured by means of the radial expansion of the front portion of the said wall-plug; this expansion is produced by means of an expansion cone which is fitted into the front extremity of the axial passage of the wall-plug which has been withdrawn for this purpose from the above-mentioned hole and which is then replaced after being thus fitted with the said expansion cone. As and when the expansion cone abuts against the bottom of the hole referred to above, the said cone is forcibly inserted in the extremity considered of the said axial plug-passage under the action of percussion means which produce further action on the plug, thereby effecting the desired radial expansion.

The operations of piercing, boring and immobilizing are carried out in such manner as to ensure that, when once the wall-plug has been finally set in position, the operating taper-shank projects in its entirety from the wall in which the plug is fixed, so that by applying a transverse effort on the said taper-shank, it is possible by virtue of the incipient rupture which is constituted by the circular cut or groove to detach the said taper-shank as a result of the rupture under bending and shearing of the plug body, the axial passage of which is tapped to permit of the engagement of a screw, bolt, threaded rod, etc.

The operating taper-shank which is thus separated by rupture from the plug body then constitutes a "lost" part which remains jammed or "stuck" inside the corresponding housing of the operating chuck from which the said part has then to be driven out. The extraction of the operating taper-shank is often difficult since it calls for substantial efforts and entails losses of time, particularly as the operator who has the task of fixing wall-plugs is frequently placed in awkward and by no means stable positions at the top of a ladder, on a narrow scaffolding, etc., with his hands already encumbered by the drilling tool, the weight and size of which are not negligible.

To the above-mentioned drawback there is also added a further disadvantage which arises from the seizing of the cylindrical wall-plug inside its hole during the operations of boring and/or withdrawal and replacing of the plug. In fact, the fragments of waste material produced as a result of the piercing or boring by percussion must in principle be effectively removed through the axial passage of the plug, but in practice, a small fraction of the fragmentary waste material has a tendency to escape between the plug body and the wall of the hole. In point of fact, if the operation is carried out with care, the wall-plug forms a cylindrical hole which has practically the same diameter as the plug body, with the result that the passage of certain fragments inside this very limited annular space often produces a veritable seizure of the plug during its penetration, this seizure resulting in a loss of the power employed for the driving of the wall-plug into the material.

The present invention has for its object a certain number of improvements in wall-plugs of the type referred-to above, the purpose of these improvements being to overcome the disadvantages previously mentioned (withdrawal of the operating taper-shank from the operating chuck and seizure of the wall-plug inside the hole during the boring operation) and to provide even further advantages. The said improvements can be applied separately although it is preferable to carry them into effect by combining them in order to have the benefit of the maximum advantages achieved by the present invention.

A first improvement is characterized in that, instead of the operating taper-shank which provides a friction coupling in conjunction with the operating tool, the rear extremity of the wall-plug comprises an operating head having a shape such that the coupling of the said operating head and of the operating tool is a free coupling at least in the axial direction, without any interlocking member being employed between the said operating head and the said operating tool.

In one form of embodiment, the operating head is polygonal in cross section and adapted to be engaged inside a correspondingly shaped housing of the operating member (operating chuck, percussion-tool head, etc.).

It can readily be seen that by means of such an arrangement, there is no longer any danger of "sticking" between the rear portion employed for the operation of the wall-plug, on the one hand, and the means for operating the said plug, on the other hand.

In a preferred form of practical application of this improvement, this latter is further characterized by the following features and combinations thereof:

The operating head has a shape such that a transverse cross-section is in the shape of a regular polygon;

The transverse cross-section which has the shape of a regular polygon has an even number of sides;

In an alternative form, the operating head has a cylindrical shape;

In order to temporarily interlock in the axial direction the wall-plug and the operating member, there is formed in the operating head a holding recess at right angles to the axis of the plug and intended to receive retaining means which are temporarily fitted into the operating member;

The holding recess formed in the operating head is a groove which is preferably circular and which is intended to receive, by way of temporary retaining means, the two arms of a U-link or pin which is fitted into the operating member;

In an alternative form, which is preferably applicable in the extreme case in which the transverse cross-section of the operating head is circular, that is to say, in which the operating head has a cylindrical shape, the holding recess is a simple hole which passes through the plug at right angles to the axis thereof and which is intended to receive a detachable pin inserted through the said hole and passing through the operating member, this arrangement serving for the purpose not only of temporarily interlocking the said member and the plug in the axial direction (for the purpose of drawing the plug out of its hole with a view to fitting the expansion cone in position) but also for the purpose of effecting the rotary drive of the said plug.

A further improvement is characterized in that the tapping of the axial hole of the wall-plug extends inside the operating head, so that when once the operating head has been detached from the plug body, the said operating head, irrespective of its shape (prismatic, cylindrical or even frusto-conical) can serve as a nut which can be engaged on a threaded rod (or like element), this latter being screwed into the tapped portion of the axial hole of the plug body.

Yet a further improvement consists in that the plug body has a prismatic shape and has a transverse cross-section in the shape of a regular polygon.

In the case in which the operating head has the shape of a regular prism, the plug body has preferably the same prismatic shape as the said operating head.

It can immediately be seen that in the case of the plug body which has a prismatic shape, this latter can no longer jam inside the hole as long as the said body has not been designedly immobilized therein by virtue of the expansion of the front toothed portion of the plug body. In fact, as a result of the rotation imparted to the plug during the boring of the hole, the said hole is cylindrical and the diameter thereof is at least equal to the cylindrical surface envelope of the plug body, with the result that there are provided small spaces between the wall of the hole and the lateral faces of the plug body, and that by means of these spaces, that fraction of waste matter which tends to escape along the periphery of the plug is accordingly permitted to pass easily.

Yet another improvement consists in that the teeth of the front portion of the wall-plugs are formed, not by means of a radical cut, but by means of two straight milling operations effected diametrally in directions which intersect each other, for example two directions at an angle of 90° with respect to each other.

Further particular features and advantages of the invention will be brought out by the description which follows below and which relates to a known wall-plug and to examples of construction of improved wall-plugs in accordance with the present invention, the said description being given with reference to the accompany drawings, in which:

FIG. 1 is a side view of a self-boring wall-plug of known type;

FIG. 2 is a similar view of an expansion cone designed to produce the radial expansion of the front portion of the wall-plug;

FIG. 3 is a view in partial longitudinal cross-section, on a smaller scale, of the wall-plug with its operating means and seen during the boring of a hole in a wall;

FIG. 4 is a view in partial longitudinal cross-section showing the wall-plug fixed inside the wall, the operating head having been removed, while the front portion of the wall-plug is anchored as a result of the expansion produced inside its housing by the expansion cone;

FIG. 5 is a view with a portion broken away, of the operating chuck and of the wall-plug operating head which has to be driven off the said operating chuck by means of a wedge-shaped key, the said wall-plug operating head being separated from the plug body (by bending and shearing rupture);

FIG. 6 is a view in elevation of a wall-plug comprising the application of a first improvement (operating head having a polygonal cross-section);

FIG. 7 is a view in cross-section taken along the line VII—VII of FIG. 6;

FIG. 8 is a view in cross-section taken along the line VIII—VIII of FIG. 6;

FIG. 11 is a view in elevation of a wall-plug comprising the application of two improvements (operating head and wall-plug body both having a polygonal cross-section);

FIG. 12 is a view in cross-section taken along the line XII—XII of FIG. 11;

Figure 15:
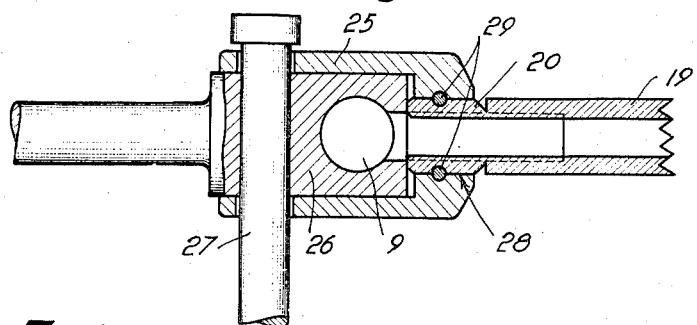
FIG. 15 is a view in partial cross-section showing the improved wall-plug of FIGS. 6 to 8 (or that of FIGS. 11 and 12) fitted inside the operating member which is coupled to the percussion device.
Figures 16, 17:
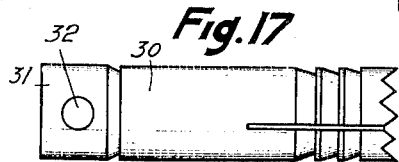

FIG. 16 is a view in elevation of the U-link or pin which is employed in the assembly illustrated in FIG. 15 for the purpose of temporarily interlocking the wall-plug and the operating member; and lastly, FIG. 17 is a view in elevation of an alternative form of the improved wall-plug in which the said wall-plug comprises a cylindrical operating head pierced with a transverse hole for the insertion of a pin intended to provide a temporary coupling both axially and in rotation between the said pin and the operating member.

Self-boring wall-plugs of known types such as that designated by the reference C comprise, as can be seen in FIG. 1, a hollow cylindrical body 1 in the front portion of which there are formed annular anchoring grooves 2 and which terminates in longitudinal teeth 3, the said teeth being cut in accordance with a radiating system starting from the axis of the plug. The rear portion of the wall-plug has a frusto-conical shape and constitutes an operating taper-shank 4 connected to the body 1 by a narrowed annular zone or cut 5 forming a point of incipient rupture.

The axial passage of the plug body is tapped at 1a up to the level of the groove 5, as can be seen in FIG. 3.

The expansion cone 6, as shown in FIG. 2, is intended to effect the final fixation of the wall-plug, as will be explained below.

The self-boring wall-plug is affixed or set, as can be seen in FIG. 3, by means of an operating chuck 7 in which is formed on the one hand a frontal frusto-conical hole or gripping jaw 8 having a shape which corresponds to that of the operating taper-shank 4 and in which is formed on the other hand a transverse passage 9 into which the hole 8 opens with a view to permitting the removal of the major part of the fragments of waste material m produced as a result of the boring by the said wall-plug of the plug-housing or hole T formed in the wall M.

The operating chuck 7, which is coupled to striking means which have not been shown in the drawings, for example a compressed-air hammer, electric hammer, etc., is additionally provided with an operating handle or rod 10 which serves to rotate the wall-plug C about its longitudinal axis while the said plug is subjected to blows struck by the percussion means on the aforementioned chuck.

After the hole T has thus been bored to a depth at which the point of incipient rupture (annular cut) comes flush with the wall, the wall-plug is withdrawn from the hole so as to engage in the said hole the front end of the expansion cone 6. This withdrawal is made possible by virtue of the temporary coupling between the wall-plug and the chuck, this coupling being due to the frusto-conical shape of the rear portion 4 of the wall-plug and to the corresponding shape of the housing 8 which is formed in the front portion of the operating chuck 7. The wall-plug C, fitted this time with the expansion cone 6, is then replaced inside the hole 10 and once again subjected to the action of percussion means so as to produce the effect of driving the said cone 6 (which is in abutment against the bottom of the hole) inside the axial passage of the wall-plug.

This operation results in the radial expansion of the front portion of the wall-plug, and this expansion, which is facilitated by means of longitudinal grooves 1b formed in the plug body, continues until the plug has been driven further inside its hole and the annular cut 5 comes flush with the wall. At this moment, the operator applies a transverse effort on the tool which is fitted with the chuck 7, consequently effecting the separation (as a result of rupture under bending and shearing stress and in the plane of the annular cut 5) of the operating taper-shank 4 and of the plug body which is already immovably fixed inside the hole T, as can be seen in FIG. 4. There can then be screwed a threaded rod, screw, threaded bolt, etc. inside the tapped portion 1a of the plug.

During the boring of the hole T, or at the time of withdrawal of the plug (with a view to effecting the setting in position of the expansion cone), or alternatively when the plug fitted with its cone is reinserted inside the said hole, it is frequently observed that fragments of waste material $m$ penetrate inside the annular space which is comprised between the plug and the wall of the hole and accordingly result in a veritable seizure of the plug, such seizure entailing an abnormal expenditure of energy, thereby constituting a drawback.

Moreover, when once the operating taper-shank 4 is separated from the plug, the said taper-shank remains (by reason of its shape) "stuck" inside the hole 8 of the chuck 7 and the expulsion of the said taper-shank which makes it essential to employ a wedge-shaped key 11, as shown in FIG. 5, calls for substantial efforts; this expulsion is frequently difficult to achieve by reason of the awkward position in which the operator can be working (on top of a ladder, etc.).

In order to overcome this latter drawback and in accordance with the present invention, the operating taper-shank 4 of known wall-plugs is replaced (as shown in FIGS. 6, 7 and 8) by an operating head 14 having the shape of a prism of polygonal cross-section (hexagonal, for example) and the housing which is formed inside the operating member (and which corresponds to the conical hole 8 of the chuck 7 of FIGS. 3 and 5) has a corresponding prismatic shape. This arrangement eliminates any jamming or "sticking" effect but permits of the rotary operation of the wall-plug. Moreover, the tapping 16a which is cut inside the wall-plug also extends inside the head 14.

In order to provide a temporary rigid coupling in the axial direction between the said wall-plug and the operating member, the operating head 14 which is connected to the plug body 16 (which terminates in teeth 13) by a narrowed portion or annular cut 14a forming a point of incipient rupture, has a circular groove 15 which is intended to receive a U-link or pin which is detachably inserted in the operating member (as can be seen in FIGS. 15 and 16).

When once the operating head 14 is separated from the plug body, the said head can serve as a nut which is engaged on a threaded rod, this latter being screwed into the plug which is immobilized inside the wall. The screwing of the said nut can be effected by means of the operating member itself which accordingly serves as a box-spanner.

Figure 9:
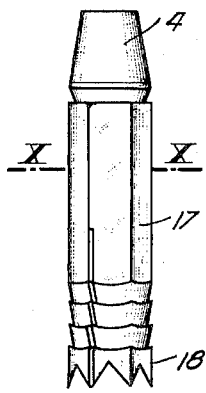
FIG. 9 is a view in elevation of a wall-plug comprising the application of a further improvement (wall-plug body having a polygonal cross-section)
Figure 10:
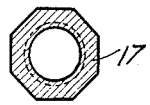
FIG. 10 is a view in cross-section taken along the line X—X of FIG. 9.

In order to overcome the drawback which arises from the seizing of the wall-plug inside the hole bored by this latter, it is possible as can be seen in FIGS. 9 and 10 which illustrate a wall-plug with operating taper-shank 4, to impart to the plug body 17 the shape of a prism having a transverse cross-section in the shape of a regular polygon, for example an octagonal shape.

Accordingly, only the longitudinal ridges which delimit the faces of the prism are in contact with the wall of the hole, with the result that the fragments of waste material which would otherwise have a tendency to pass between the wall-plug and the hole are permitted to pass freely and can no longer give rise to jamming. The prismatic shape of the wall-plug additionally permits of easier expansion of its toothed extremity, this being achieved by virtue of a better penetration of the external ridges of the prism into the material which is accordingly subjected to a lesser degree of compression.

In the case of a prismatic wall-plug body, the boring teeth 18 are preferably formed by means of two simple milling operations effected at right angles to each other, all necessary steps being taken to ensure that the summits of the teeth are in correspondence externally with the ridges of the prism.

A number of methods of manufacture of improved wall-plugs in accordance with the invention can be contemplated. In the case of the wall-plug of FIGS. 6, 7 and 8, it is possible, for example, to employ angle-bar of polygonal section on which the head 14 is directly formed, the body 16 and similarly the groove 15, the annular cut 14a and the anchoring grooves are then formed by simple machining on a lathe. It is also possible to employ round rod and to mill therein the head of polygonal cross-section.

When angle-bar of polygonal section is employed, there can very easily be formed self-boring wall-plugs in which the two improvements described above (prismatic head and prismatic body) are again carried into effect. A wall-plug of this type is illustrated in FIGS. 11 and 12 in which the plug body 19 and operating head 20 are both prismatic and are formed from an angle-bar of corresponding cross-section. The machining operation is in that case limited to the cutting of the retaining groove 21, of the annular cut 22 and of the anchoring grooves 23, on the one hand, and to the milling of the teeth 24 and of the longitudinal grooves 19a, on the other hand. The teeth are milled so that the apexes or cutting edges thereof extend radially of the body (as shown in FIGURES 13 and 14).

Figures 13, 14:
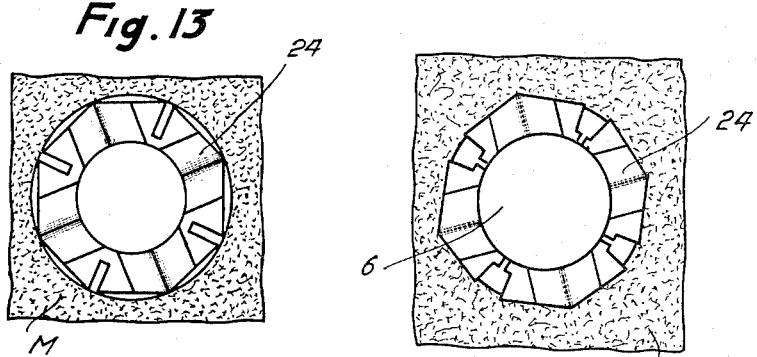
FIG. 13 is an end view seen from the front and on a larger scale, of the wall-plug of FIGS. 9 and 10 (or of that of FIGS. 11 and 12) and looking inside the hole bored by the said wall-plug in the wall which is intended to receive it.
FIG. 14 is a view which is similar to the preceding, the front extremity of the wall-plug having been subjected to expansion by the expansion cone.

FIG. 13 shows, looking from the front and on a larger scale, the prismatic-body plug of FIGS. 11 and 12 located inside the hole which it has bored; this figure provides an idea of the passages which certain boring fragments can follow between the plug and the wall of the hole.

FIG. 14 is a view which is similar to the preceding, the front portion of the plug having been expanded radially by the expansion cone 6.

The operating member of a wall-plug of the prismatic-head type is preferably constituted (as shown in FIG. 15) by an interchangeable socket 25 which is adapted to be fitted over the chuck 26 of the striking tool and rigidly coupled to the said chuck by means of the operating rod or handle 27. The interchangeable socket 25 is provided with a polygonal gripping jaw 28 corresponding to the wall-plug head 20 (which is assumed to be the head 20 of FIG. 11). In order to temporarily immobilize the plug inside the socket and in the axial direction, there is provided a U-link or pin 29 (as shown also in FIG. 16), the arms of which, when engaged inside the socket, are also engaged with the groove 21 of the plug.

In an alternative form which is illustrated in FIG. 17, the rear portion of a plug having a body 30 of cylindrical shape can also be prevented from jamming inside the operating chuck by replacing the conventional cone or taper-shank by a cylindrical operating head 31, in which case the operating chuck is also provided with a cylindrical hole for the purpose of receiving the said operating head. The temporary interlocking for rotation and in the axial direction of the wall-plug and the chuck is in that case effected by means of a simple detachable cotter-pin or drift-pin which is inserted through a diametral hole 32 formed in the head 31 of the plug and through a corresponding hole formed in the operating chuck.

In all the new forms of execution of the wall-plug operating head, it is possible to make use of the operating member, in particular the interchangeable socket 25 and the operating handle 27, as a box-spanner for the purpose of locking the nut which is constituted by the operating head (after this latter has been detached from the body of the wall-plug which has been finally and definitely driven into position).

It is obvious that the examples of practical application of the improvements which have been described above and which have been illustrated in the accompanying drawings have been given solely by way of indication and not in any sense by way of limitation and that any detail modification can be made therein without thereby departing from the spirit of the invention, which also includes within its scope the new industrial products which are constituted, on the one hand, by a self-boring wall-plug comprising the application of all or a part of the said improvements and, on the other hand, by a tool head which is designed for the operation of a wall-plug of this type.

What I claim is:

In a self-boring wall-plug which is adapted to be forced and adjustably positioned in a hard and compact material and which comprises a hollow body having a toothed front end portion for boring a hole into said material and a rear end portion constituting a detachable operating head which is shaped to receive a removable interlocking tool means for immobilizing and detaching said operating head from the body of said plug after the same has been set in position, said body and detachable operating head having an outer surface polygonal in cross-section and said front teeth being constituted by two sets of teeth having radially extending apexes cut at an angle of 90° to each other and so positioned that the outer end of the apex of each tooth terminates at a corner of said body.

References Cited by the Examiner

UNITED STATES PATENTS

| | | | |
|---|---|---|---|
| 805,008 | 11/05 | Ertle | 175—414 |
| 1,290,172 | 1/19 | Gilman | 175—415 |
| 1,621,598 | 3/27 | Phillips. | |
| 1,755,489 | 4/31 | Phillips. | |
| 1,762,349 | 6/30 | Phillips. | |
| 1,952,264 | 3/34 | Larson | 175—419 |
| 1,996,121 | 4/35 | Phillips. | |
| 2,171,985 | 9/39 | Musket. | |
| 2,540,937 | 2/51 | Edens | 279—79 |
| 2,806,706 | 9/57 | Fitch | 279—79 |
| 2,963,935 | 12/60 | Shields. | |
| 3,024,031 | 3/62 | Davidson | 279—79 |
| 3,049,358 | 8/62 | Polos. | |
| 3,117,486 | 1/64 | Matthews | 85—61 |
| 3,123,370 | 3/64 | Unander | 85—68 |

EDWARD C. ALLEN, *Primary Examiner.*